(12) United States Patent
Cohen et al.

(10) Patent No.: US 6,530,971 B1
(45) Date of Patent: Mar. 11, 2003

(54) NICKEL-BASE BRAZE MATERIAL AND BRAZE REPAIR METHOD

(75) Inventors: Joel Heywood Cohen, Cincinnati, OH (US); David Edwin Budinger, Loveland, OH (US); James Michael Caldwell, Alexandria, KY (US); Michael Glenn Gordon, Springdale, OH (US); Edward John Emilianowicz, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/771,898

(22) Filed: Jan. 29, 2001

(51) Int. Cl.[7] .................................................. B22F 1/00
(52) U.S. Cl. ......................................... 75/254; 148/24
(58) Field of Search ............................... 75/254; 148/24

(56) References Cited

U.S. PATENT DOCUMENTS

| | | | |
|---|---|---|---|
| 4,073,639 A | * 2/1978 | Duvall et al. | 75/255 |
| 4,381,944 A | * 5/1983 | Smith et al. | 228/119 |
| 5,437,737 A | * 8/1995 | Draghi et al. | 148/22 |
| 5,902,421 A | 5/1999 | Christy | 148/528 |

* cited by examiner

*Primary Examiner*—Roy King
*Assistant Examiner*—Tima McGuthry-Banks
(74) *Attorney, Agent, or Firm*—David L. Narciso; Gary M. Hartman; Domenica N. S. Hartman

(57) ABSTRACT

A braze material and method for repairing an article, such as a gas turbine engine combustor liner formed from a nickel-base or cobalt-base superalloy. The braze material is composed of a nickel-base braze alloy that is preferably in powder form and may be dispersed in a suitable vehicle to yield a slurry, putty or solid tape. The braze alloy is formulated to be capable of withstanding the high temperature operating environment of a combustor liner, and to have a melting temperature below the grain growth or incipient melting temperature of the superalloy to be repaired. A preferred braze alloy is formed by combining at least two nickel-base powders. A suitable composition for the braze alloy is, in weight percent, about 10 to about 19 chromium, about 3 to about 10.5 cobalt, about 1.75 to about 4.9 titanium, about 0.75 to about 3.4 aluminum, about 1.25 to about 4.1 tungsten, about 1.25 to about 4.1 molybdenum, about 0.025 to about 0.225 carbon, about 0.005 to about 0.15 zirconium, about 0.50 to about 2.6 boron, up to 1.5 iron, with the balance being nickel and incidental impurities.

13 Claims, 1 Drawing Sheet

NICKEL-BASE BRAZE MATERIAL AND BRAZE REPAIR METHOD

FIELD OF THE INVENTION

The present invention relates to brazing materials and methods for repairing components that operate at high temperatures. More particularly, this invention relates to repairs made with a braze material containing a nickel-base alloy whose composition is suited for the repair of nickel-base and cobalt-base superalloys of the type used to form combustor liners of gas turbine engines.

BACKGROUND OF THE INVENTION

High temperature cobalt-base and nickel-base superalloys are used in the manufacture of components that must operate at high temperatures, such as combustor and turbine components of gas turbine engines. During engine operation, these components are subject to strenuous high temperature conditions under which various types of damage or deterioration can occur. For example, combustor liners suffer cracks that typically initiate at surface irregularities such as igniter tubes or large diameter dilution holes, and propagate as a result of stresses that are aggravated by thermal cycling. Because the cost of components formed from high temperature cobalt and nickel-base superalloys is relatively high, it is typically more desirable to repair these components than to replace them.

Repair methods for combustor liners forged from superalloys have included tungsten inert gas (TIG) welding techniques. In conventional air-cooled combustor liners, relatively large dilution holes (e.g., diameters of 0.20 inch (about 5 mm) or more) spaced apart more than ten times the hole diameter are typical. TIG welding has been well suited for such repairs as a result of necessitating only limited post-weld work, while being practical in view of the relatively large spacing and size of the dilution holes. However, with improvements in the efficiencies of gas turbine engines, improved cooling methods have become necessary. Such methods typically involve reduced cooling air flow applied more uniformly over the cooled surfaces. This, coupled with increased combustion inlet temperatures and the development of materials with greater fatigue strength, has led to the development of combustor liners that employ transpiration film cooling, in which a far greater number of much smaller cooling holes are uniformly dispersed at the liner surface. Transpiration cooling holes are precision formed by such methods as laser machining to be inclined to the liner surface and closely spaced to produce uniform film cooling over the flow path surfaces of the liners, thus reducing thermal damage from hot combustion gases. However, the use of transpiration film cooling has complicated the field repair of cracks in combustor liners from service distress. Though often still initiating at surface irregularities, cracking typically progresses through multiple transpiration holes. Because of the smaller hole size and spacing, conventional weld repair can be expensive as a result of the filling and destruction of a large number of transpiration holes in and adjacent the repair site, requiring restoration of the holes by laser drilling or electrical-discharge machining (EDM).

A more recent and cost-effective approach developed for the repair of superalloy components is termed activated diffusion healing, or ADH, which involves a vacuum brazing operation. The ADH process employs an alloy powder or mixtures of powders that will melt at a lower temperature than the superalloy component to be repaired. If two powders are combined, one of the powders is formulated to melt at a much lower temperature than the other powder, such that upon melting a two-phase mixture is formed. The vacuum brazing cycle causes the braze powder mixture to melt and alloy together and with the superalloy of the component being repaired. A post-braze diffusion heat treatment cycle is then performed to promote further interdiffusion, which raises the remelt temperature of the braze mixture.

With the advent of higher strength and more highly alloyed superalloys, improved repair materials have been required that are specialized for the particular superalloy to be repaired. It is often the intent to provide a braze alloy that will result in a repair characterized by high strength and a microstructure that is closely matched with the microstructure of the article being repaired. As a result, a considerable variety of braze alloy materials have been developed for use in the ADH process and other braze repair techniques. While many highly suitable repair materials have been formulated to perform well with various high strength cobalt-base and nickel-base superalloys, the prior art lacks a braze repair material that is especially formulated to repair combustor liners formed from certain superalloys. Of primary concern here, braze repair materials for liners must be uniquely tailored to the mechanical and environmental properties required for the particular liner to be repaired, whose property requirements will depend on the type of engine and its application, whether aerospace or industrial.

BRIEF SUMMARY OF THE INVENTION

The present invention provides a braze material and method for repairing an article, such as gas turbine engine combustor liners formed from nickel-base and cobalt-base superalloys. The braze material is composed of a nickel-base braze alloy that is preferably in powder form and dispersed in a suitable vehicle, such as a binder that can be chosen to form a slurry, putty or a solid tape with the powder. The binder serves to adhere the braze alloy particles together, as well as adhere the particles to the article to be repaired. Alternatively, the braze alloy particles can be sintered together to yield a rigid repair preform.

According to this invention, the braze alloy is formulated to be capable of withstanding the high temperature operating environment of a combustor liner, and to have a melting temperature below the grain growth or incipient melting temperature of the superalloy to be repaired. A preferred braze alloy is formed by combining at least two nickel-base powders. A first of the powders consists essentially of, in weight percent, 10 to 18 chromium, 6 to 14 cobalt, 3.5 to 6.5 titanium, 1.5 to 4.5 aluminum, 2.5 to 5.5 tungsten, 2.5 to 5.5 molybdenum, 0.05 to 0.30 carbon, 0.01 to 0.20 zirconium, 0.001 to 0.2 boron, wherein the combination of tungsten and molybdenum is at least 5.0, the balance being nickel and incidental impurities. The second powder consists essentially of, in weight percent, 10.0 to 20.0 chromium, 2.0 to 5.0 boron, up to 3.0 iron, the balance being nickel and incidental impurities. A suitable weight ratio of the first powder to the second is about 50:50 to 75:25. A suitable combined composition for the braze alloy is, in weight percent, about 10 to about 19 chromium, about 3 to about 10.5 cobalt, about 1.75 to about 4.9 titanium, about 0.75 to about 3.4 aluminum, about 1.25 to about 4.1 tungsten, about 1.25 to about 4.1 molybdenum, about 0.025 to about 0.225 carbon, about 0.005 to about 0.15 zirconium, about 0.50 to about 2.6 boron, up to 1.5 iron, with the balance being nickel and incidental impurities. As used herein, incidental impurities are those elements that may be difficult to completely eliminate from the braze alloy due to processing limitations, yet are not present in sufficient quantities to significantly alter or degrade the desired properties of the alloy.

According to this invention, a method for repairing a superalloy combustor liner entails filling cracks, voids or other distressed surface regions of the liner with the braze material, after which the liner is heated in a vacuum environment to a temperature sufficient to cause the braze alloy to melt, flow and fill the cracks/voids, and to promote wetting and alloying of the braze alloy with the superalloy of the liner, such that a metallurgical bond results upon cooling. For the braze alloy of this invention, a temperature of not more than about 2200° F. (about 1200° C.) is sufficient to melt and flow the braze alloy without causing grain growth or incipient melting of the liner superalloy. Thereafter, the superalloy preferably undergoes a heat treatment to promote further interdiffusion between the braze alloy and the liner superalloy.

According to this invention, the braze alloy is ideally formulated to be compatible with certain superalloys that have been specially developed for combustor liners for gas turbine engines, and particularly those used in aerospace applications. As a repair material, the braze alloy exhibits excellent wettability of cracks and voids with nickel-base and cobalt-base superalloys, and the resulting repairs exhibit stress-rupture properties that meet or exceed that of liners repaired by conventional TIG methods. A preferred composition for the braze material has the additional advantage of having a sufficiently high viscosity at braze temperatures to allow the braze alloy to flow into and fill cracks and other distressed areas, yet inhibits the molten alloy from flowing and plugging surrounding cooling holes. This advantage has been observed even where cracks intersect small and closely-spaced transpiration cooling holes of an air-cooled liner.

Other objects and advantages of this invention will be better appreciated from the following detailed description.

DETAILED DESCRIPTION OF THE INVENTION

The present invention provides a braze material and method for repairing components that must operate at elevated temperatures, and particularly combustor liners of gas turbine engines. Combustor liners are formed from nickel-base and cobalt-base superalloys whose compositions are specially formulated to withstand the hostile thermal and corrosive environment of a gas turbine engine, and which are processed to develop microstructures that promote the high temperature properties of the liner. The braze material of this invention is particularly suited for repairing voids and cracks in air-cooled combustor liners by having a composition that is compatible with the nickel-base and cobalt-base superalloys from which the liners are formed. The braze material is also capable of readily wetting and metallurgically bonding to these superalloy substrates, while minimizing the amount of rework required to restore cooling holes of such liners.

Figure 1:
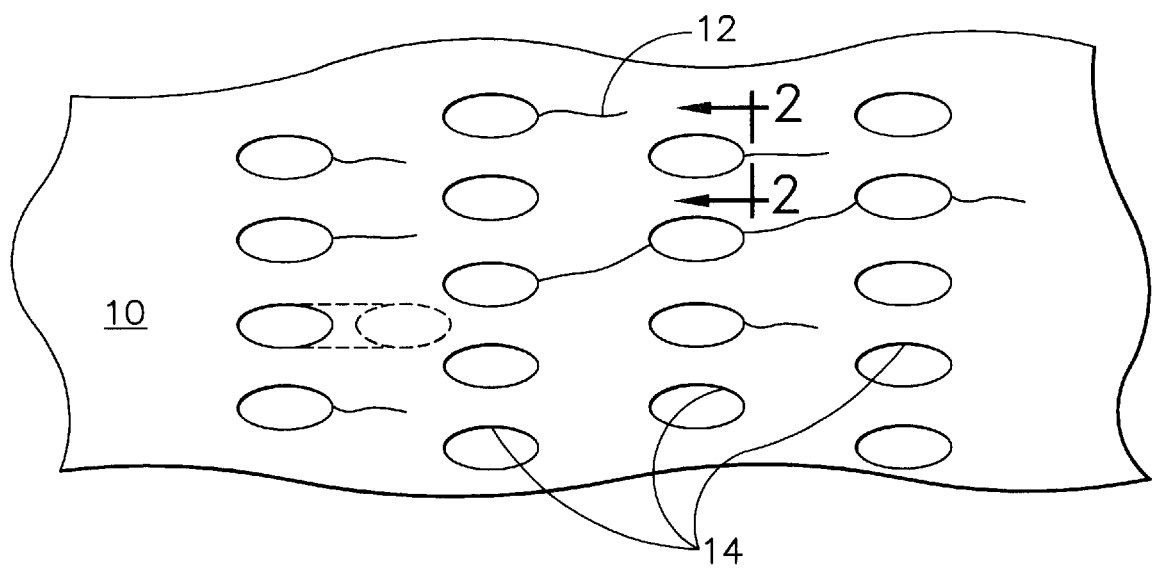
FIG. 1 is a plan view of a surface region of a gas turbine engine combustor liner.
Figure 2:
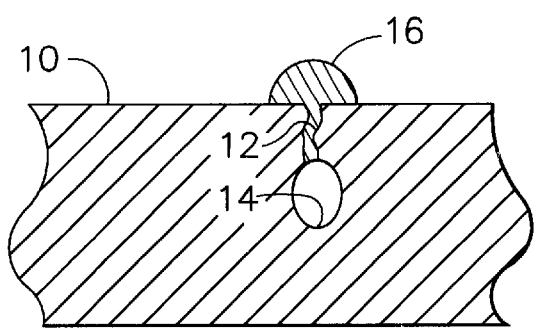
FIG. 2 is a cross-sectional view of the surface region of FIG. 1 after being repaired with the braze material of this invention.

FIGS. 1 and 2 represent a combustor liner 10 in which a crack 12 through a transpiration film cooling hole 14 of the liner 10 has been filled with a braze alloy 16 formed in accordance with this invention. Combustor liners 10 are prone to develop cracks of the type represented due to service distress encountered by the liner 10, including thermal cycling and exposure to high temperature combustion gases that promote oxidation of the liner's surfaces. The braze alloy 16 of this invention is employed to fill the crack 12, forming a repair that metallurgically bonds to the superalloy of the liner 10.

The braze alloy 16 of this invention has a high melting temperature, but less than the grain growth or incipient melting temperature of the liner superalloy in order to preserve its desired microstructure during the repair process. In addition, the braze alloy is formulated to be compatible with the composition of the superalloy to be repaired. A highly successful superalloy for combustor liners of gas turbine engines is a nickel-base superalloy known as GTD222. The GTD222 superalloy has a nominal composition, in weight percent, of about 22.5 chromium, about 14.0 cobalt, about 2.3 titanium, about 1.2 aluminum, about 2.0 tungsten, about 0.8 columbium (niobium), and about 1.0 tantalum, with the balance being nickel and incidental impurities. Another successful superalloy is IN 939, which has a nominal composition in weight percent of 22.4% chromium, 19.0% cobalt, 3.7% titanium, 1.9% aluminum, 2.0% tungsten, 1.4% tantalum, 1.0% niobium, 0.10% zirconium, 0.15% carbon and 0.009% boron, the balance nickel. These superalloys are desirable for their high temperature properties, though it is foreseeable that other nickel-base superalloys and cobalt-base superalloys could foreseeably be repaired with the braze material of this invention.

According to this invention, the braze alloy 16 has the following base composition, in weight percent: about 10 to about 19 chromium, about 3 to about 10.5 cobalt, about 1.75 to about 4.9 titanium, about 0.75 to about 3.4 aluminum, about 1.25 to about 4.1 tungsten, about 1.25 to about 4.1 molybdenum, about 0.025 to about 0.225 carbon, about 0.005 to about 0.15 zirconium, about 0.50 to about 2.6 boron, up to 1.5 iron, with the balance being nickel and incidental impurities. A preferred composition for the braze alloy 16 is, in weight percent, about 13.4 to about 15.3 chromium, about 5.8 to about 6.5 cobalt, about 3.1 to about 3.4 titanium, about 1.8 to about 2.1 aluminum, about 2.4 to about 2.8 tungsten, about 2.4 to about 2.8 molybdenum, about 0.10 to about 0.13 carbon, about 0.02 to about 0.07 zirconium, about 1.0 to about 1.4 boron, up to 1.0 iron, with the balance being nickel and incidental impurities. As stated above, the braze alloy 16 is metallurgically compatible with the GTD222 and IN 939 superalloys. In addition, the braze alloy 16 has a brazing range of about 2140° F. (about 1170° C.) to about 2215° F. (about 1215° C.), which is less than the temperature at which the GTD222 and IN 939 superalloys exhibit grain growth or incipient melting, or would otherwise be adversely affected by the brazing cycle.

The braze alloy 16 is preferably formed from a braze material whose composition includes at least two nickel-base alloy powders. The powder particles have a preferred size range of about −140 to about +325 mesh, though it is foreseeable that larger or smaller particles could be employed, depending on the type of repair to be made. A first of the alloy powders has a composition similar to that of René 80, a superalloy well known in the art. Particularly, the first alloy powder has a composition, in weight percent, of 10 to 18 chromium, 6 to 14 cobalt, 3.5 to 6.5 titanium, 1.5 to 4.5 aluminum, 2.5 to 5.5 tungsten, 2.5 to 5.5 molybdenum, a combined tungsten and molybdenum content of at least 5.0, 0.05 to 0.30 carbon, 0.01 to 0.20 zirconium, 0.001 to 0.2 boron, and the balance nickel and incidental impurities. A preferred composition for the first alloy powder is, in weight percent, 13.7 to 14.3 chromium, 9.0 to 10.0 cobalt, 4.80 to 5.20 titanium, 2.80 to 3.20 aluminum, 3.70 to 4.30 tungsten, 3.70 to 4.30 molybdenum, a combined tungsten and molybdenum content of at least 7.7, 0.15 to 0.19 carbon, 0.03 to 0.10 zirconium, 0.01 to 0.02 boron, the balance being nickel and incidental impurities. The combined tungsten and molybdenum content is important to ensure an adequate amount of solid solution strengthener, so that the braze alloy 16 will have suitable mechanical properties at elevated temperatures. In addition, chromium and aluminum promote the oxidation resistance of the braze alloy 16, titanium and aluminum form gamma prime precipitates that promote the mechanical properties of the alloy 16, and the presence of carbon, zirconium and boron yield brain boundary precipitates within the alloy 16. The second alloy powder is formulated to melt at a much lower temperature than the first powder, such that upon melting of the powder mixture, a two-phase mixture will form. A suitable material for the second alloy powder is Alloy 775, with a composition, in weight percent, of 10.0 to 20.0 chromium, 2.0 to 5.0 boron and up to 3.0 iron, with the balance being nickel and incidental impurities. A preferred composition for the second alloy powder is, in weight percent, 13.00 to 17.00 chromium, 3.00 to 4.00 boron, up to 1.5 iron, with the balance being nickel and incidental impurities. The first and second alloy powders are combined at a weight ratio of about 50:50 to 75:25, more preferably 65:35.

The braze material is preferably provided and used in the form of a slurry, though the braze material can also be used in the form of a putty, a presintered preform, or a plasticized tape, each of which will generally involve a mixture of the two alloy powders and a binder. In the preferred form, where the alloy powders are combined with an organic binder, the braze material can be applied as a slurry that can be readily and accurately deposited to fill the crack 12, and remain adhered to the surface of the liner 10 throughout the brazing operation. Such binders are well known in the industry, and would generally include any commercially available, environmentally safe braze binder, such as COTRONICS 4B.

According to this invention, a method for repairing the liner 10 includes preparing the braze material in accordance with any one of the methods noted above. The braze material is applied in such a manner as to ensure that the molten braze alloy will fill the crack 12 and wet the surfaces of the crack 12, such that a metallurgical bond develops between the braze alloy 16 and the liner superalloy, yielding a repair portion characterized by a combination of mechanical properties (e.g., tensile and stress-rupture) that meets and may exceed the properties of the superalloy at elevated operating temperatures. The braze material and the superalloy are heated within a vacuum or inert atmosphere to the braze alloy melting temperature, i.e., about 2140° F. to about 2215° F., preferably about 2200° F. (about 1200° C.) for a period of about twenty minutes, which is sufficient to volatilize the binder and flow the alloy powders, yet sufficiently low to maintain the microstructure of the superalloy substrate. As noted above, the second of the powders is formulated to melt at a much lower temperature than the first powder, such that upon heating the second powder melts first and then dissolves the first powder, creating a two-phase mixture that alloys together to form the braze alloy 16. Thereafter, the repaired liner 10 preferably undergoes a heat treatment cycle at a temperature of about 2075° F. (about 1135° C.) to about 2125° F. (about 1165° C.), preferably about 2100° F. (about 1150° C.) for a duration of about 0.5 to about 4 hours, preferably about two hours, in order to further interdiffuse the braze alloy 16 and the superalloy. After heat treatment, any excess braze alloy 16 can be removed by conventional grinding methods.

If the superalloy is GTD222, the liner 10 must be rapidly cooled from the diffusion temperature to below 815° C. (about 1500° F.) at a rate of at least 30° C. (about 50° F.) per minute to produce a continuous carbide film along the grain boundaries of the GTD222 substrate material. Cooling at a slower rate or holding for a prolonged time within the 815° C. to 1150° C. temperature range results in a nonuniform carbide film at the grain boundaries, which reduces the ductility and low cycle fatigue life of a liner formed from GTD222.

The above-described repair process has been successfully evaluated on combustor liners installed on test engines, which demonstrated that the braze alloy 16 forms a repair that is equivalent to previous TIG weld repairs. The evaluations included inner and outer combustor liners having thousands of closely-spaced transpiration cooling holes similar to that shown in FIG. 1. The holes were precision formed by laser machining to produce film cooling along the flow path surfaces of the liners to prevent thermal damage to the liners by hot combustion gases. In the past, repairs performed by TIG welding on these liners resulted in numerous cooling holes becoming plugged with weldment material, necessitating regeneration of the holes by laser drilling or electrical-discharge machining (EDM). Another problem observed with prior TIG repairs is that residual stresses and substrate distortion caused by high welding temperatures would occasionally render repaired liners non-serviceable. In contrast, the lower temperatures used with the brazing operation of this invention do not create detrimental residual stresses in the substrate material, such that minimal distortion occurs.

Also with the use of the braze material of this invention, the number of cooling holes plugged is greatly reduced because the lower brazing temperatures allow for the use of stop-off or stop-off sticks in cooling holes in and adjacent to the area being repaired, preventing the holes from becoming plugged. Suitable stop-off materials include liquid braze blocking compositions, such as those containing fine oxide particles suspended in a liquid carrier medium. A preferred stop-off stick is a solid yet flexible preform insert composed of a refractory metal oxide powder dispersed in a polymeric solid, disclosed in U.S. Pat. No. 5,935,718 to Demo et al. Notably, when the preferred alloy powders are combined in the preferred ratio, repairs can be performed with the braze alloy without the use of a stop-off material. This feature of the invention is attributable to the braze alloy having a high viscosity at the braze temperature, allowing the molten alloy to fill cracks and other distressed areas while inhibiting the molten alloy from flowing into the cooling holes. This advantage of the invention has been observed even when the braze alloy is used to repair cracks that intersect cooling holes.

While the invention has been described in terms of a preferred embodiment, it is apparent that other forms could be adopted by one skilled in the art. For example, the physical configuration of the braze material could vary considerably, various binders could be used, and the braze material could be used in brazing operations that differ from that noted here. Therefore, the scope of the invention is to be limited only by the following claims.

What is claimed is:

1. A nickel-base braze material for repairing nickel-base and cobalt-base superalloy articles (10), the braze material comprising first and second nickel-base powders, the first nickel-base powder consisting essentially of in weight percent: 10 to 18 chromium, 6 to 14 cobalt, 3.5 to 6.5 titanium, 1.5 to 4.5 aluminum, 2.5 to 5.5 tungsten, 2.5 to 5.5 molybdenum, 0.05 to 0.30 carbon, 0.01 to 0.20 zirconium, 0.001 to 0.2 boron, wherein the combination of tungsten and molybdenum is at least 5.0, the balance being nickel and incidental impurities; the second nickel-base powder consisting of, in weight percent: 10.0 to 20.0 chromium, 2.0 to 5.0 boron, up to 3.0 iron, the balance being nickel and incidental impurities, wherein the weight ratio of the first nickel-base powder to the second nickel-base powder in the braze material is about 50:50 to 75:25.

2. A nickel-base braze material according to claim 1, further comprising a binder.

3. A nickel-base braze material according to claim 2, wherein the nickel-base braze material is in a form selected from the group consisting of a slurry, tape or putty.

4. A nickel-base braze material according to claim 1, wherein the first and second nickel-base powders are sintered together such that the nickel-base braze material is in the form of a sintered preform.

5. A nickel-base braze material according to claim 1, wherein the first nickel-base powder consists of, in weight percent: 13.7 to 14.3 chromium, 9.0 to 10.0 cobalt, 4.80 to 5.20 titanium, 2.80 to 3.20 aluminum, 3.70 to 4.30 tungsten, 3.70 to 4.30 molybdenum, 0.15 to 0.19 carbon, 0.03 to 0.10 zirconium, 0.01 to 0.02 boron, wherein the combination of tungsten and molybdenum is at least 7.7, the balance being nickel and incidental impurities.

6. A nickel-base braze material according to claim 1, wherein the second nickel-base powder consists of, in weight percent: 13.00 to 17.00 chromium, 3.00 to 4.00 boron, up to 1.5 iron, the balance being nickel and incidental impurities.

7. A nickel-base braze material according to claim 1, wherein the weight ratio of the first nickel-base powder to the second nickel-base powder in the braze material is about 65:35.

8. A nickel-base braze material according to claim 1, wherein the first and second nickel-base powders are combined within the nickel-base braze material to yield a nickel-base braze alloy that consists essentially of, in weight percent, about 10 to about 19 chromium, about 3 to about 10.5 cobalt, about 1.75 to about 4.9 titanium, about 0.75 to about 3.4 aluminum, about 1.25 to about 4.1 tungsten, about 1.25 to about 4.1 molybdenum, about 0.025 to about 0.225 carbon, about 0.005 to about 0.15 zirconium, about 0.50 to about 2.6 boron, up to 1.5iron, with the balance being nickel and incidental impurities.

9. A superalloy article having a crack filled with the braze material recited in claim 1.

10. A superalloy article according to claim 9, wherein the article is formed of a superalloy whose nominal composition is, in weight percent, either:

about 22.4 chromium, about 19.0 cobalt, about 3.7 titanium, about 1.9 aluminum, about 2.0 tungsten, about 1.4 tantalum, about 1.0 niobium, about 0.10 zirconium, about 0.15 carbon and about 0.009 boron, the balance nickel and incidental impurities; or about 22.5 chromium, about 14.0 cobalt, about 2.3 titanium, about 1.2 aluminum, about 2.0 tungsten, about 0.8 columbium, and about 1.0 tantalum, the balance nickel and incidental impurities.

11. A superalloy article according to claim 9, wherein the article is a combustor liner of a gas turbine engine.

12. A superalloy article according to claim 9, wherein the combustor liner is formed of a nickel-base or cobalt-base superalloy, the combustor liner having transpiration cooling holes and a crack through at least one of the holes, the crack being filled with a nickel-base braze alloy formed by the nickel-base braze material, the nickel-base braze alloy consisting essentially of, in weight percent, about 10 to about 19 chromium, about 3 to about 10.5 cobalt, about 1.75 to about 4.9 titanium, about 0.75 to about 3.4 aluminum, about 1.25 to about 4.1 tungsten, about 1.25 to about 4.1 molybdenum, about 0.025 to about 0.225 carbon, about 0.005 to about 0.15 zirconium, about 0.50 to about 2.6 boron, up to 1.5 iron, with the balance being nickel and incidental impurities.

13. A combustor liner according to claim 12, wherein the nickel-base braze alloy consists essentially of, in weight percent, about 13.4 to about 15.3 chromium, about 5.8 to about 6.5 cobalt, about 3.1 to about 3.4 titanium, about 1.8 to about 2.1 aluminum, about 2.4 to about 2.8 tungsten, about 2.4 to about 2.8 molybdenum, about 0.10 to about 0.13 carbon, about 0.02 to about 0.07 zirconium, about 1.0 to about 1.4 boron, up to 1.0 iron, with the balance being.nickel and incidental impurities.

* * * * *